(12) United States Patent
Kannadassan et al.

(10) Patent No.: US 11,863,614 B2
(45) Date of Patent: Jan. 2, 2024

(54) UDP OVER HTTP LOADBALANCER FOR MICROSERVICE ENVIRONMENT

(71) Applicant: Microsoft Technology Licensing, LLC, Redmond, WA (US)

(72) Inventors: K. Balaji Kannadassan, Chennai (IN); Neeraj Surana, Bengaluru (IN); Kantha Rao Dammalapati, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 212 days.

(21) Appl. No.: 17/530,389

(22) Filed: Nov. 18, 2021

(65) Prior Publication Data
US 2023/0156076 A1    May 18, 2023

(51) Int. Cl.
*H04L 67/1008* (2022.01)
*H04L 45/12* (2022.01)
(Continued)

(52) U.S. Cl.
CPC ........ *H04L 67/1008* (2013.01); *H04L 45/123* (2013.01); *H04L 45/74* (2013.01);
(Continued)

(58) Field of Classification Search
CPC ..... H04L 67/1008; H04L 45/74; H04L 67/02; H04L 67/101; H04L 67/141; H04L 45/123
See application file for complete search history.

(56) References Cited

U.S. PATENT DOCUMENTS

| | | | |
|---|---|---|---|
| 6,970,933 | B1 | 11/2005 | Masters |
| 9,154,369 | B2 | 10/2015 | Denis-courmont et al. |

(Continued)

FOREIGN PATENT DOCUMENTS

| | | |
|---|---|---|
| CN | 104243267 A | 12/2014 |
| CN | 107483390 B | 10/2020 |
| CN | 111885075 A | 11/2020 |

OTHER PUBLICATIONS

"International Search Report and Written Opinion Issued in PCT Application No. PCT/US22/042589", dated Nov. 25, 2022, 15 Pages.

(Continued)

*Primary Examiner* — Suraj M Joshi
(74) *Attorney, Agent, or Firm* — Ray Quinney & Nebeker; James Bullough

(57) ABSTRACT

A first plurality of UDP packets corresponding to a first session and a second plurality of UDP packets corresponding to a second session can be received at a core network node. The first plurality of UDP packets and the second plurality of UDP packets have the same source five tuple. A first plurality of HTTP packets comprising first session information identifying the first session can be created based on the first plurality of UDP packets. A second plurality of HTTP packets comprising second session information identifying the second session can be created based on the second plurality of UDP packets. The first plurality of HTTP packets can be routed to a first microservice instance based at least in part on the first session information. The second plurality of HTTP packets can be routed to a second microservice instance based at least in part on the second session information.

20 Claims, 10 Drawing Sheets

(51) Int. Cl.
    *H04L 45/74* (2022.01)
    *H04L 67/02* (2022.01)
    *H04L 67/141* (2022.01)
    *H04L 67/101* (2022.01)
(52) U.S. Cl.
    CPC ............ *H04L 67/02* (2013.01); *H04L 67/101* (2013.01); *H04L 67/141* (2013.01)

(56) References Cited

U.S. PATENT DOCUMENTS

| | | | |
|---|---|---|---|
| 10,110,714 | B2 | 10/2018 | Frey et al. |
| 11,005,919 | B2 | 5/2021 | Chauhan |
| 2014/0006481 | A1* | 1/2014 | Frey ........................ H04L 69/22 709/203 |
| 2019/0335520 | A1* | 10/2019 | Dion ........................ H04L 69/14 |
| 2021/0243247 | A1* | 8/2021 | He ........................... H04L 67/63 |

OTHER PUBLICATIONS

Schinazi, D., "UDP Proxying Support for HTTP", Retrieved From: https://datatracker.ietf.org/doc/html/draft-ietf-masque-connect-udp-06, Oct. 25, 2021, 13 Pages.

Antichi, et al., "Full-stack SDN: The Next Big Challenge?", In Proceedings of the Symposium on SDN Research, Mar. 3, 2020, pp. 48-54.

Suo, et al., "An Analysis and Empirical Study of Container Networks", In Proceedings of the IEEE Conference on Computer Communications, Apr. 16, 2018, 9 Pages.

* cited by examiner

UDP OVER HTTP LOADBALANCER FOR MICROSERVICE ENVIRONMENT

CROSS-REFERENCE TO RELATED APPLICATIONS

N/A

BACKGROUND

Cellular networks are widely deployed to provide various communication services such as voice, text messaging, multimedia data, internet connectivity, and the like. Cellular networks can be multiple-access networks capable of supporting multiple users by sharing the available network resources.

Cellular networks generally provide coverage over a wide geographic area. A typical cellular network includes a large number of overlapping geographic areas, or cells, each of which is served by one or more base stations. Mobile devices connect to a cellular network via a radio link to a base station. Base stations are connected to a core network, which facilitates circuit-switched voice communications between mobile devices and with telephones in the wider public switched telephone network (PSTN). Base stations are also connected to a packet switched network, which enables data packets to be sent to and received from external networks such as the internet. Major telecommunications providers have deployed voice and data cellular networks in many areas throughout the world.

Cellular networks have undergone significant changes over the past several decades. The first two generations of cellular networks supported voice and then text messaging. Third generation (3G) networks initiated the transition to broadband access, supporting data rates typically measured in hundreds of kilobits-per-second. Fourth generation (4G) networks supported data rates that were significantly faster, typically measured in megabits-per-second. Today, the industry is transitioning from 4G to fifth generation (5G) networks, with the promise of significant increases in data rates.

The 5G system architecture is significantly different from its predecessors in many respects. For example, in a 5G system, network management can be software driven, and network functions and resources can be virtualized at the edges and inside the network core. A 5G system implementation can be based on cloud-native applications, virtualized network functions, and microservices-based design patterns.

A microservice architecture is an architectural style that structures an application as a collection of services that are independently deployable. In this context, the term "service" refers to at least one function or operation that is performed by an application. A service may be associated with a particular network address (e.g., a uniform resource locator (URL) for Internet services). With a microservice architecture, clients may use all or only some of the services provided by an application. Also, different clients may use the same service for different purposes.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

One aspect of the present disclosure is directed to a method that is implemented by a load balancer microservice in a first core network node that comprises a plurality of microservices. The method comprises receiving a User Datagram Protocol (UDP) packet from a second core network node. The UDP packet comprises a UDP payload. The UDP payload comprises a higher layer packet that includes session information identifying a session corresponding to the higher layer packet. The method also comprises creating a Hypertext Transfer Protocol (HTTP) packet for sending the UDP packet between the plurality of microservices in the first core network node. The method also comprises inserting the UDP payload of the UDP packet into the HTTP payload of the HTTP packet. The method also comprises adding a cookie comprising the session information to an HTTP header of the HTTP packet. The method also comprises causing the HTTP packet to be sent to another microservice in the first core network node via networking components. The microservice comprises a plurality of microservice instances that could receive the HTTP packet. The session information in the cookie causes the networking components to route the HTTP packet to a microservice instance that is associated with the session corresponding to the higher layer packet in the UDP packet.

In some embodiments, the method further comprises extracting the session information from the UDP payload of the UDP packet based at least in part on a known offset from a beginning of the UDP payload.

In some embodiments, the method further comprises creating a custom header in the HTTP payload of the HTTP packet. The custom header can comprise a source address and a source port corresponding to the second core network node.

In some embodiments, the first core network node comprises a serving gateway (SGW), and the second core network node comprises a mobility management entity.

In some embodiments, the first core network node comprises a packet gateway (PGW), and the second core network node comprises a serving gateway (SGW).

In some embodiments, the higher layer packet comprises a packet that is sent based on the General Packet Radio Service (GPRS) Tunneling Protocol (GTP).

Another aspect of the present disclosure is directed to a method that is implemented by networking components in a telecommunications network. The telecommunications network includes a first core network node comprising a plurality of microservices. The method comprises receiving an Hypertext Transfer Protocol (HTTP) packet sent by a first microservice within the first core network node and destined for a second microservice within the first core network node. The second microservice comprises a plurality of microservice instances. The HTTP packet comprises an HTTP header and an HTTP payload. The HTTP payload comprises a User Datagram Protocol (UDP) payload from a UDP packet. The HTTP header comprises a cookie that includes session information identifying a session corresponding to a higher layer packet in the UDP payload. The method further comprises determining, based at least in part on the session information, whether the session is associated with any of the plurality of microservice instances in the second microservice. When the session is associated with a microservice instance in the second microservice, the method further comprises causing the HTTP packet to be routed to the microservice instance. When the session is not associated with any of the plurality of microservice instances in the second microservice, the method further comprises selecting one of the plurality of microservice instances in the second microservice to receive the HTTP packet, and routing the HTTP packet to the selected microservice instance.

In some embodiments, when the session is not associated with any of the plurality of microservice instances in the second microservice, the method further comprises storing an association between the session and the selected microservice instance.

In some embodiments, determining whether the session is associated with any of the plurality of microservice instances in the second microservice can comprise searching one or more data structures that store associations between particular sessions and particular microservice instances.

In some embodiments, selecting one of the plurality of microservice instances in the second microservice to receive the HTTP packet can be based at least in part on a degree of loading currently experienced by the plurality of microservice instances in the second microservice.

In some embodiments, the HTTP payload of the HTTP packet further comprises a custom header, the custom header comprises a source address and a source port corresponding to a second core network node, and the second core network node sends the UDP packet.

In some embodiments, the UDP payload comprises the higher layer packet, and the higher layer packet comprises the session information that is provided in the cookie.

Another aspect of the present disclosure is directed to a system for intelligent load balancing in a microservice environment. The system comprises at least one processor, and at least one memory storing computer-executable instructions that, when executed by the at least one processor, cause the at least one processor to perform various operations. The operations include receiving, at a first core network node, a first plurality of User Datagram Protocol (UDP) packets corresponding to a first session and a second plurality of UDP packets corresponding to a second session. The first plurality of UDP packets and the second plurality of UDP packets are sent by a second core network node. The operations also include creating a first plurality of Hypertext Transfer Protocol (HTTP) packets based on the first plurality of UDP packets. The first plurality of HTTP packets each comprise first session information identifying the first session. The operations also include creating a second plurality of HTTP packets based on the second plurality of UDP packets. The second plurality of HTTP packets each comprise second session information identifying the second session. The operations also include causing the first plurality of HTTP packets and the second plurality of HTTP packets to be sent to a microservice via networking components. The networking components route the first plurality of HTTP packets to a first instance of the microservice based at least in part on the first session information in the first plurality of HTTP packets. The networking components route the second plurality of HTTP packets to a second instance of the microservice based at least in part on the second session information in the second plurality of HTTP packets.

In some embodiments, each UDP packet among the first plurality of UDP packets and the second plurality of UDP packets comprises a higher layer packet. The higher layer packet in each of the first plurality of UDP packets comprises the first session information, and the higher layer packet in each of the second plurality of UDP packets comprises the second session information.

In some embodiments, the higher layer packet comprises a packet that is sent based on the General Packet Radio Service (GPRS) Tunneling Protocol (GTP).

In some embodiments, each HTTP packet among the first plurality of HTTP packets and the second plurality of HTTP packets comprises a cookie in an HTTP header. The cookie in each of the first plurality of HTTP packets comprises the first session information, and the cookie in each of the second plurality of HTTP packets comprises the second session information.

In some embodiments, the operations also include causing the at least one processor to create a custom header in each of the first plurality of HTTP packets and the second plurality of HTTP packets. The custom header comprises a source address and a source port corresponding to the second core network node.

In some embodiments, the networking components route the first plurality of HTTP packets to the first instance of the microservice based on the first session information and a first record in a data structure associating the first session with the first instance of the microservice. The networking components route the second plurality of HTTP packets to the second instance of the microservice based on the second session information and a second record in the data structure associating the second session with the second instance of the microservice.

In some embodiments, the first core network node comprises a serving gateway (SGW), and the second core network node comprises a mobility management entity.

In some embodiments, the first core network node comprises a packet gateway (PGW), and the second core network node comprises a serving gateway (SGW).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

The present disclosure is generally related to a cellular network in which at least some core network nodes are implemented as microservices. More specifically, the present disclosure is related to addressing certain challenges that arise when core network nodes that are implemented as microservices communicate via the User Datagram Protocol (UDP).

Figure 1A:
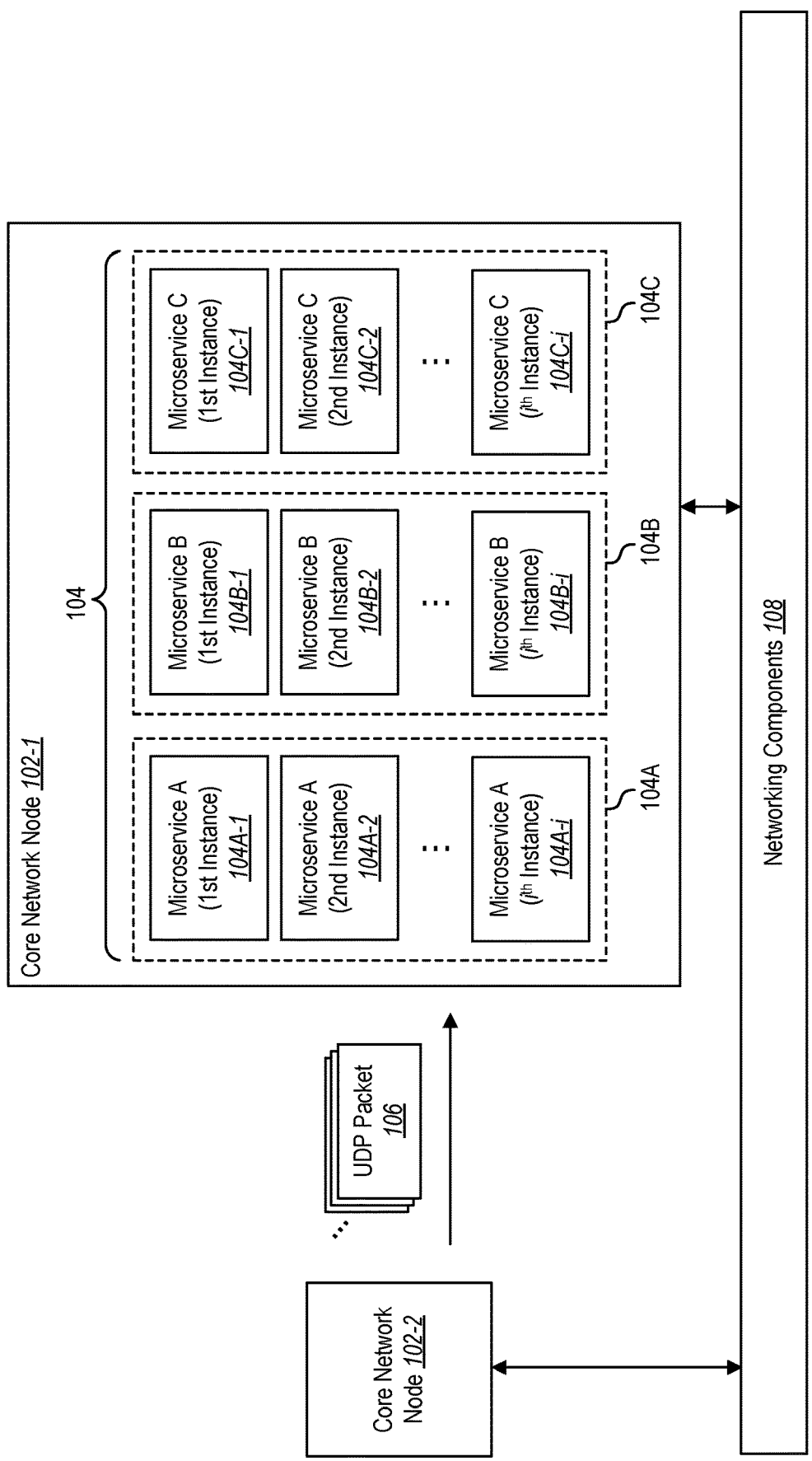
FIG. 1A illustrates an example of a core network node that includes a plurality of microservices.

One challenge that arises in this type of environment is related to load balancing. An example will be described in relation to FIGS. 1A-B. Reference is initially made to FIG. 1A, which shows a core network node 102-1 that is implemented using a plurality of different microservices 104. More specifically, FIG. 1A shows a core network node 102-1 that includes three microservices 104, which will be referred to as microservice A 104A, microservice B 104B, and microservice C 104C. When a UDP packet 106 is received by the core network node 102-1, the UDP packet 106 could initially be processed by microservice A 104A, then by microservice B 104B, and then by microservice C 104C. The processed UDP packet could be consumed by the core network node 102-1 and/or sent to another destination, such as another core network node (not shown).

There can be a plurality of different instances of each microservice 104. The number of instances of a particular microservice 104 can vary depending on the load that is being experienced by that microservice 104. As the load being experienced by a particular microservice 104 increases, additional instances of the microservice 104 can be provisioned. The converse is also true: as the load being experienced by a particular microservice 104 decreases, the number of instances of the microservice 104 can be reduced. This process of increasing and decreasing the number of instances of a microservice 104 based on load is typically referred to as horizontal scaling.

For purposes of example, FIG. 1A shows microservice A 104A with i instances, microservice B 104B with j instances, and microservice C 104C with k instances. In particular, the core network node 102-1 is shown with a first instance of microservice A 104A-1, a second instance of microservice A 104A-2, and an $i^{th}$ instance of microservice A 104A-i. The core network node 102-1 is also shown with a first instance of microservice B 104B-1, a second instance of microservice B 104B-2, and a $j^{th}$ instance of microservice B 104B-j. The core network node 102-1 is also shown with a first instance of microservice C 104C-1, a second instance of microservice C 104C-2, and a $k^{th}$ instance of microservice C 104C-k.

The values of i, j, and k can be any integer that is greater than or equal to one. Under some circumstances, the values of i, j, and k can be different from one another. In other words, the core network node 102-1 can include a different number of instances of microservice A 104A, microservice B 104B, and microservice C 104C. Under other circumstances, however, the values of i, j, and k can be equal to one another. In other words, under some circumstances, the core network node 102-1 can include the same number of instances of microservice A 104A, microservice B 104B, and microservice C 104C.

Ideally, the load being experienced by a particular microservice 104 should be distributed across the plurality of instances of that microservice 104. For example, the load being experienced by microservice A 104A should be distributed across the first instance of microservice A 104A-1, the second instance of microservice A 104A-2, and the $i^{th}$ instance of microservice A 104A-i (as well as any other instances of microservice A 104A that are not shown in FIG. 1A). However, the characteristics of the network configuration can make this challenging when communication occurs via UDP.

In the depicted example, the core network node 102-1 receives UDP packets 106 from another core network node 102-2. The core network node 102-1 that receives the UDP packets 106 may be said to be "upstream" from the core network node 102-2 that sends the UDP packets 106. Conversely, the core network node 102-2 that sends the UDP packets 106 may be said to be "downstream" from the core network node 102-1 that receives the UDP packets 106.

FIG. 1A shows networking components 108 communicatively coupled to the core network nodes 102-1, 102-2. The networking components 108 represent various components that cause the UDP packets 106 sent by the core network node 102-2 to be delivered to the core network node 102-1. In some embodiments, the networking components 108 can include a service mesh.

As noted above, one challenge that arises in this type of environment is related to load balancing. This challenge arises because all of the UDP packets 106 from the core network node 102-2 have the same five tuple. In this context, the term "five tuple" refers to a set of five different values including a source IP address, a source port number, a destination IP address, a destination port number, and the protocol in use. Because all of the UDP packets 106 from the core network node 102-2 have the same five tuple, then the networking components 108 cause all of the UDP packets 106 from the core network node 102-2 to be delivered to the same instance of the various microservices 104 in the core network node 102-1.

Figure 1B:
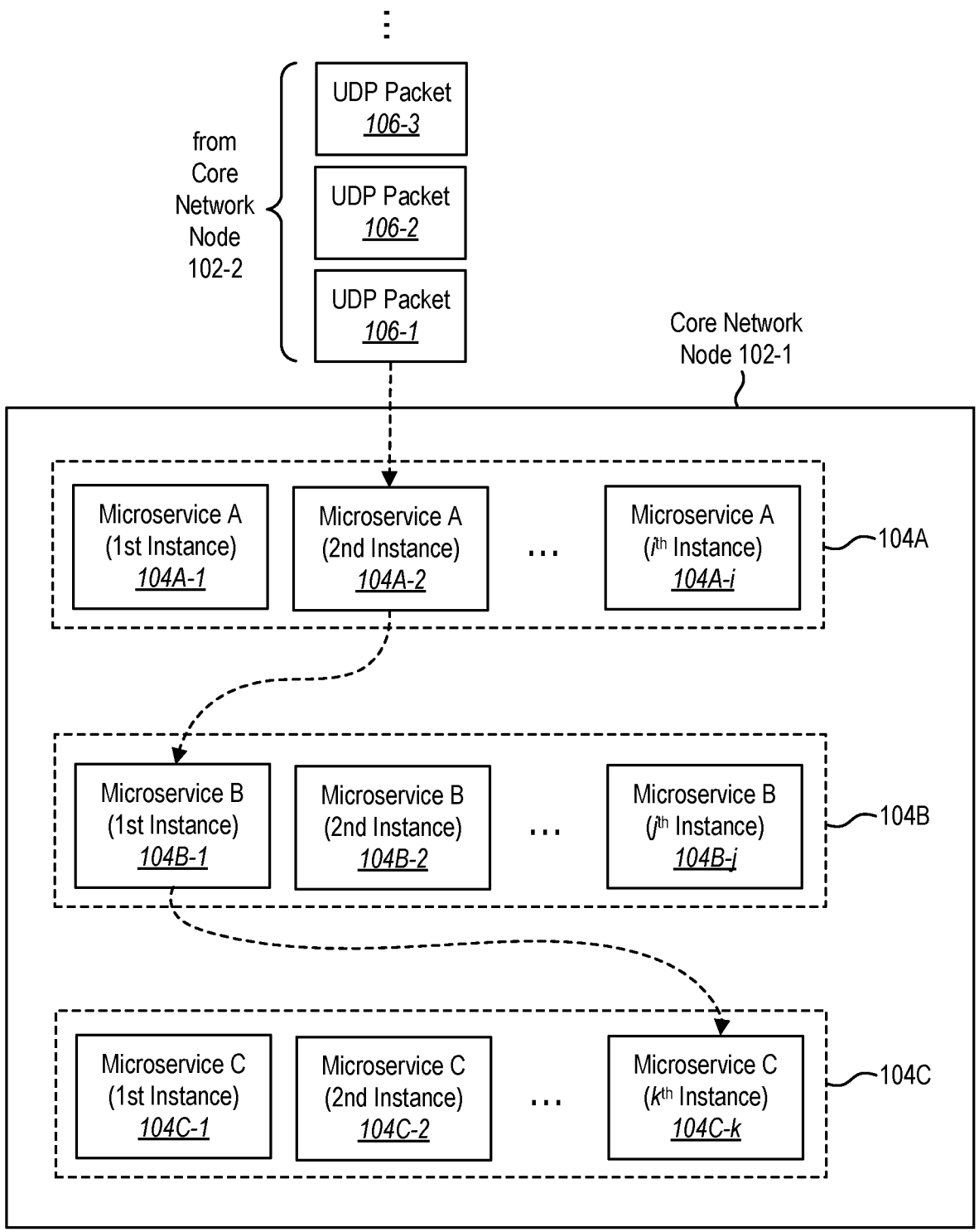
FIG. 1B illustrates how UDP packets from another core network node are delivered to the same microservice instances of the core network node shown in FIG. 1A.

An example will be described in relation to FIG. 1B. Suppose that the source IP address and port in a first UDP packet 106-1 from the core network node 102-2 causes the first UDP packet 106-1 to be delivered to the second instance of microservice A 104A-2, the first instance of microservice B 104B-1, and the $k^{th}$ instance of microservice C 104C-k in the core network node 102-1. Subsequent UDP packets 106 from the core network node 102-2 (including a second UDP packet 106-2, a third UDP packet 106-3, and so forth) would follow the same path and would also be delivered to the second instance of microservice A 104A-2, the first instance of microservice B 104B-1, and the k$^{th}$ instance of microservice C 104C-k. However, because all of the UDP packets 106 from the core network node 102-2 are being delivered to the same microservice instances 104A-2, 104B-1, 104C-k at the core network node 102-1, these microservice instances 104A-2, 104B-1, 104C-k would be overutilized and the other microservice instances would be underutilized. It would essentially defeat the purpose of horizontally scaling the microservices in the core network node 102-1.

One objective of the techniques disclosed herein is to perform load balancing so that the UDP packets 106 from the core network node 102-2 are distributed across the various instances of the microservices that are included in the core network node 102-1. In other words, instead of having all of the UDP packets 106 from the core network node 102-2 be delivered to the same instance of the various microservices (as in the example shown in FIG. 1B), the techniques disclosed herein enable the delivery of the UDP packets 106 to be distributed across the various instances of the microservices that are included in the core network node 102-1.

However, the distribution of the UDP packets 106 should occur in an intelligent and intuitive manner, such that all UDP packets 106 corresponding to the same session are delivered to the same microservice instance though all the five tuples are the same. For example, suppose that the first UDP packet 106-1 is delivered in the manner shown in FIG. 1B (i.e., to the second instance of microservice A 104A-2, the first instance of microservice B 104B-1, and the k$^{th}$ instance of microservice C 104C-k). If the second UDP packet 106-2 corresponds to the same session as the first UDP packet 106-1, then the second UDP packet 106-2 should also be delivered to these same microservices instances 104A-2, 104B-1, 104C-k. However, if the second UDP packet 106-2 corresponds to a different session than the first UDP packet 106-1, then for the sake of load balancing it could be desirable for the second UDP packet 106-2 to be delivered to different microservice instances other than the microservice instances 104A-2, 104B-1, 104C-k to which the first UDP packet 106-1 was delivered.

Figure 2A:
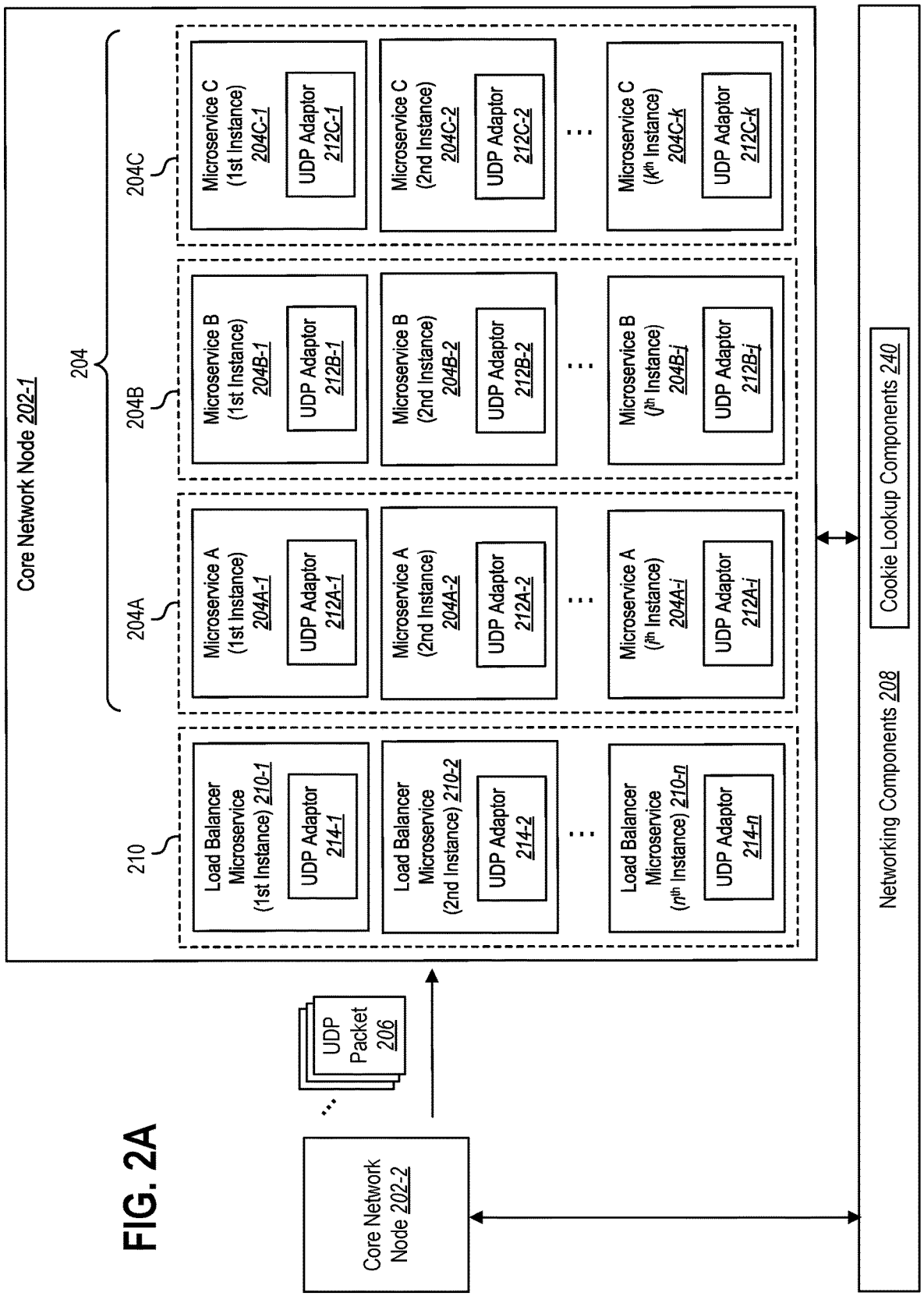
FIG. 2A illustrates an example of a core network node that includes a load balancer microservice that is configured to facilitate intelligent load balancing in accordance with the techniques disclosed herein.

FIG. 2A shows a core network node 202-1 that is similar in some respects to the core network node 102-1 discussed previously. For example, the core network node 202-1 includes a plurality of microservices 204, which will be referred to as microservice A 204A, microservice B 204B, and microservice C 204C. There can be a plurality of different instances of each microservice 204. For purposes of example, FIG. 2A shows microservice A 204A with i instances, microservice B 204B with j instances, and microservice C 204C with k instances. In particular, the core network node 202-1 is shown with a first instance of microservice A 204A-1, a second instance of microservice A 204A-2, and an i$^{th}$ instance of microservice A 204A-i. The core network node 202-1 is also shown with a first instance of microservice B 204B-1, a second instance of microservice B 204B-2, and a j$^{th}$ instance of microservice B 204B-j. The core network node 202-1 is also shown with a first instance of microservice C 204C-1, a second instance of microservice C 204C-2, and a k$^{th}$ instance of microservice C 204C-k.

In addition to these microservices 204, the core network node 202-1 also includes a load balancer microservice 210. There can be a plurality of different instances of the load balancer microservice 210. For purposes of example, FIG. 2A shows the load balancer microservice 210 with n instances. A first instance of the load balancer microservice 210-1, a second instance of the load balancer microservice 210-2, and an n$^{th}$ instance of the load balancer microservice 210-n are shown in FIG. 2A.

All of the microservices 204, 210 include a UDP adaptor. In particular, FIG. 2A shows the various instances of microservice A 204A-1, 204A-2, 204A-i with UDP adapters 212A-1, 212A-2, 212A-i, respectively. Similarly, the various instances of microservice B 204B-1, 204B-2, 204B-j include UDP adapters 212B-1, 212B-2, 212B-j, respectively. The various instances of microservice C 204C-1, 204C-2, 204C-k include UDP adapters 212C-1, 212C-2, 212C-k, respectively. The various instances of the load balancer microservice 210-1, 210-2, 210-n include UDP adapters 214-1, 214-2, 214-n, respectively.

The core network node 202-1 receives UDP packets 206 from another core network node 202-2. FIG. 2A shows networking components 208 communicatively coupled to the core network nodes 202-1, 202-2. The networking components 208 are similar in some respects to the networking components 108 shown in FIG. 1A. For example, the networking components 208 represent various components that cause the UDP packets 206 sent by the core network node 202-2 to be delivered to the core network node 202-1. However, the networking components 208 also include cookie lookup components 240. As will be explained in greater detail below, the cookie lookup components 240 helps to ensure that all HTTP packets 230 (containing UDP packets 206) corresponding to the same session are delivered to the same microservice instance.

When the core network node 202-1 receives a UDP packet 206, the UDP packet 206 is initially processed by an instance of the load balancer microservice 210. The UDP adaptor within the instance of the load balancer microservice 210 that is processing the UDP packet 206 then creates an HTTP packet 230 (shown in FIG. 2B) from the UDP packet 206. For example, suppose that the second instance of the load balancer microservice 210-2 processes a UDP packet 206 that is received from the core network node 202-2. In this case, the UDP adaptor 214-2 creates an HTTP packet 230 from the UDP packet 206. As will be explained in greater detail below, the characteristics of the HTTP packet 230 together with the cookie lookup components 240 of the networking components 208 enable the HTTP packet 230 to be routed in a manner that is consistent with the objectives discussed above (e.g., ensuring that all UDP packets 206 corresponding to the same session are delivered to the same microservice instance).

Figure 2B:
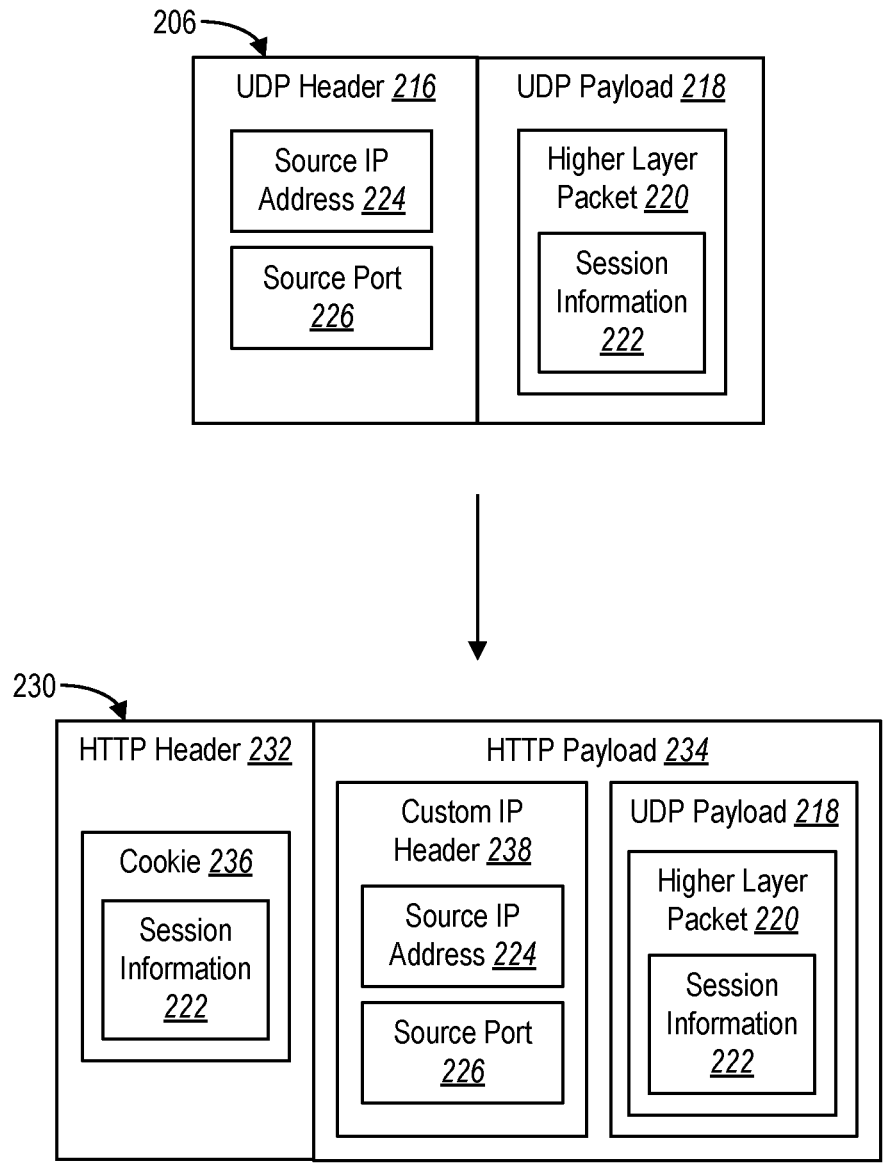
FIG. 2B shows an example of an HTTP packet that can be created from a UDP packet in accordance with the techniques disclosed herein.

FIG. 2B shows an example of a UDP packet 206 that the core network node 202-1 can receive from the core network node 202-2. The UDP packet 206 includes a UDP header 216 and a UDP payload 218. The UDP packet 206 is a transport layer packet. The UDP payload 218 can include a higher layer packet 220. The higher layer packet 220 can include session information 222 that identifies a particular session. The UDP header 216 can include the source IP address 224 and the source port 226 corresponding to the core network node 202-2 that sent the UDP packet 206.

In some embodiments, the higher layer packet 220 can refer to a packet that corresponds to a layer above the transport layer in the Open System Interconnection (OSI) model. In some embodiments, the higher layer packet 220 can be a packet that is sent in accordance with the General Packet Radio Service (GPRS) Tunneling Protocol (GTP).

In some embodiments, the term "session" can refer to an information interchange between two or more communicating devices. In some embodiments, the term "session" can refer to a packet data network (PDN) session. In a 3GPP network, a single user can have a plurality of different PDN sessions. In some embodiments, the session information 222 can include Tunnel Endpoint Information which has an endpoint identifier like TEID in case of a PDN session.

As noted above, when the core network node 202-1 receives a UDP packet 206, the UDP packet 206 is initially processed by an instance of the load balancer microservice 210. The instance of the load balancer microservice 210 that processes the UDP packet 206 includes a UDP adaptor that creates an HTTP packet 230 based on the UDP packet 206. The HTTP packet 230 includes an HTTP header 232 and an HTTP payload 234. The HTTP payload 234 can include the UDP payload 218, including the higher layer packet 220 and the session information 222.

When the UDP adaptor creates the HTTP packet 230, the UDP adaptor extracts the session information 222 from the higher layer packet 220 in the UDP payload 218 and adds this session information 222 to the HTTP header 232. In some embodiments, the session information 222 can be extracted from the higher layer packet 220 based at least in part on a known offset from a beginning of the UDP payload 218. The UDP adaptor can create a cookie 236 that includes the session information 222 and add the cookie 236 to the HTTP header 232.

The UDP adaptor can also create a custom IP header 238 for the HTTP payload 234. The custom IP header 238 can include the source IP address 224 and the source port 226 of the core network node 202-2 that sent the UDP packet 206. Having the source IP address 224 and the source port 226 of the core network node 202-2 that sent the UDP packet 206 can be helpful in certain circumstances, such as for path management when the GTP-C protocol is being used.

The cookie 236 can be a block of data within the HTTP header 232. The cookie 236 can be analogous to an HTTP cookie (also known as web cookies or browser cookies) that can be placed on a computing device used to access a website.

Figure 2C:
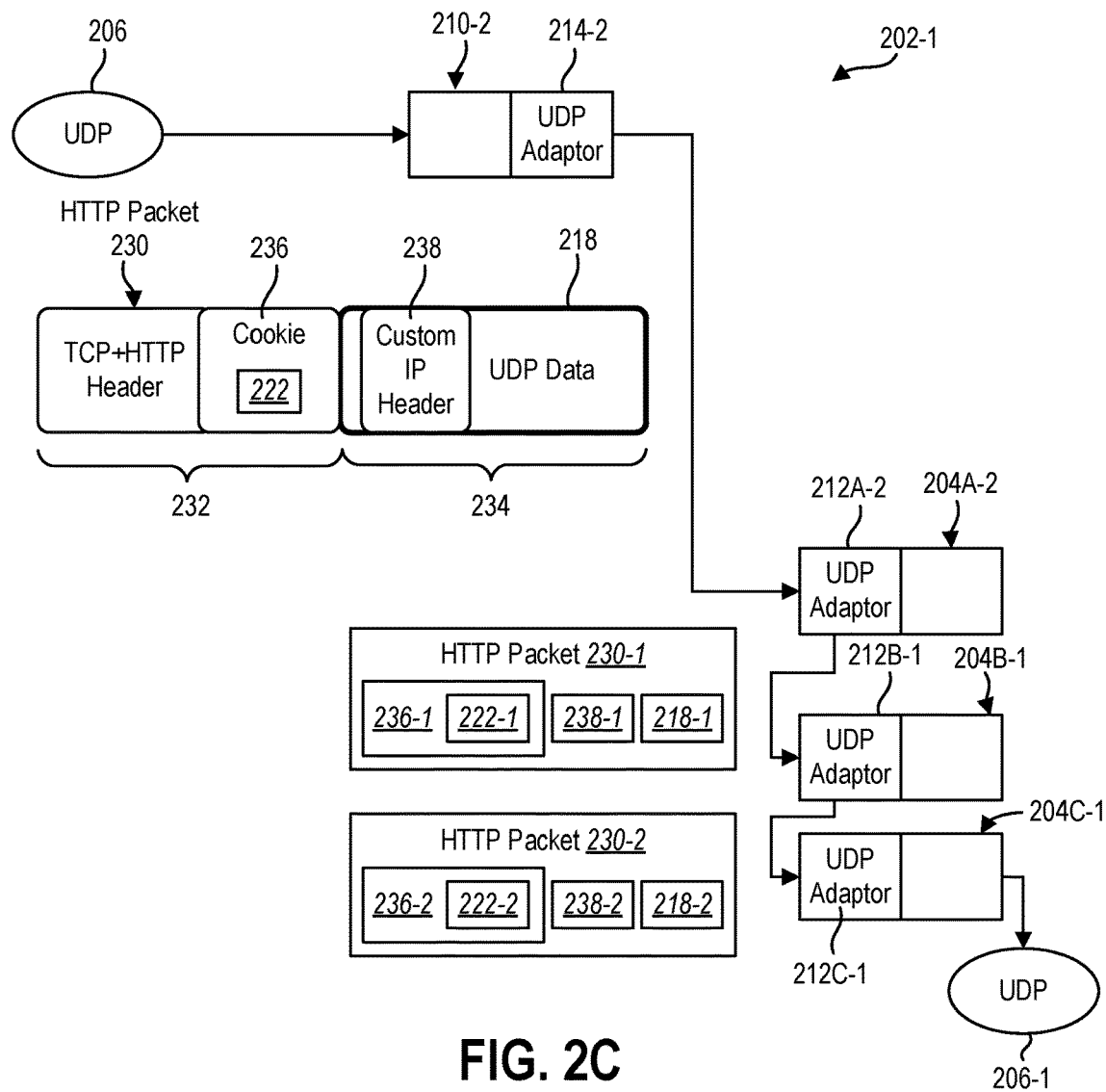
FIG. 2C illustrates how a UDP packet can be processed by the various microservices in the core network node.

FIG. 2C illustrates how the UDP packet 206 can be processed by the various microservices 204, 210 in the core network node 202-1. The UDP packet 206 is initially received by an instance of the load balancer microservice 210. For purposes of the present example, it will be assumed that the UDP packet 206 is received by the second instance of the load balancer microservice 210-2. The UDP adaptor 214-2 within the second instance of the load balancer microservice 210-2 creates an HTTP packet 230 from the UDP packet 206. The second instance of the load balancer microservice 210-2 then sends the HTTP packet 230 to microservice A 204A via the networking components 208.

Figure 2D:
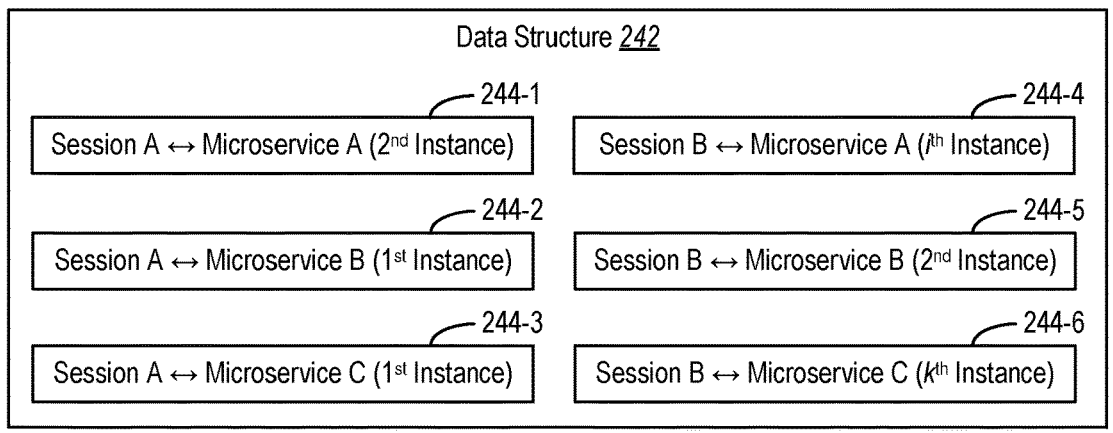
FIG. 2D illustrates an example of a data structure that stores associations between particular sessions and particular microservice instances.

For purposes of the present example, it will be assumed that the UDP packet 206 is associated with a particular session, which will be referred to as session A. When the HTTP packet 230 is sent from the second instance of the load balancer microservice 210-2 to microservice A 204A, the cookie lookup components 240 within the networking components 208 examine the session information 222 in the cookie 236 within the HTTP header 232 and determine, based on the session information 222, that the HTTP packet 230 is associated with session A. The cookie lookup components 240 then determine whether session A has previously been associated with any microservice instances. This can involve searching one or more data structures (e.g., one or more lookup tables) that store associations between particular sessions and particular microservice instances. An example of this type of data structure 242 is shown in FIG. 2D. In particular, the data structure 242 includes a record 244-1 indicating an association between session A and the second instance of microservice A 204A-2. Based on this record 244-1, the networking components 208 cause the HTTP packet 230 to be routed to the second instance of microservice A 204A-2, as shown in FIG. 2C.

When the second instance of microservice A 204A-2 receives the HTTP packet 230, the UDP adaptor 212A-2 extracts the UDP payload 218 from the HTTP payload 234. The second instance of microservice A 204A-2 processes the UDP payload 218 similarly to the way that it would have processed the UDP payload 218 if the UDP packet 206 had been delivered to the second instance of microservice A 204A-2 directly (i.e., without the HTTP conversion). The UDP adaptor 212A-2 also extracts the source IP address 224 and the source port 226 from the custom IP header 238 of the HTTP payload 234. The second instance of microservice A 204A-2 uses the source IP address 224 and the source port 226 to communicate with the core network node 202-2 that sent the UDP packet 206 (e.g., to confirm that the core network node 202-2 is still alive).

The second instance of microservice A 204A-2 sends an HTTP packet 230-1 to microservice B 204B. The HTTP packet 230-1 is similar to the HTTP packet 230. The HTTP packet 230-1 includes a cookie 236-1 that is similar to the cookie 236 in the HTTP packet 230. In particular, the cookie 236-1 includes session information 222-1 indicating that the HTTP packet 230-1 is associated with session A. The HTTP packet 230-1 also includes a custom IP header 238-1 that is similar to the custom IP header 238 in the HTTP packet 230. The HTTP packet 230-1 also includes a UDP payload 218-1. Under some circumstances, the UDP payload 218-1 in the HTTP packet 230-1 can be identical to the UDP payload 218 in the HTTP packet 230.

The cookie lookup components 240 within the networking components 208 examine the session information 222-1 in the cookie 236-1 within the HTTP packet 230-1 and determine, based on the session information 222-1, that the HTTP packet 230-1 is associated with session A. Based on the record 244-2 indicating an association between session A and the first instance of microservice B 204B-1, the networking components 208 cause the HTTP packet 230-1 to be routed to the first instance of microservice B 204B-1.

The first instance of microservice B 204B-1 sends an HTTP packet 230-2 to microservice C 204C. The HTTP packet 230-2 is similar to the HTTP packets 230, 230-1. The HTTP packet 230-2 includes a cookie 236-2 that is similar to the cookies 236, 236-1 in the HTTP packets 230, 230-1. In particular, the cookie 236-2 includes session information 222-2 indicating that the HTTP packet 230-2 is associated with session A. The HTTP packet 230-2 also includes a custom IP header 238-2 that is similar to the custom IP headers 238, 238-1 in the HTTP packets 230, 230-1. The HTTP packet 230-1 also includes a UDP payload 218-2.

The cookie lookup components 240 within the networking components 208 examine the session information 222-2 in the cookie 236-2 within the HTTP packet 230-2 and determine, based on the session information 222-2, that the HTTP packet 230-2 is associated with session A. Based on the record 244-3 indicating an association between session A and the first instance of microservice C 204C-1, the networking components 208 cause the HTTP packet 230-2 to be routed to the first instance of microservice C 204C-1.

The first instance of microservice C 204C-1 sends a UDP packet 206-1 to another core network node (not shown) that is upstream from the core network node 202-1.

Figure 2E:
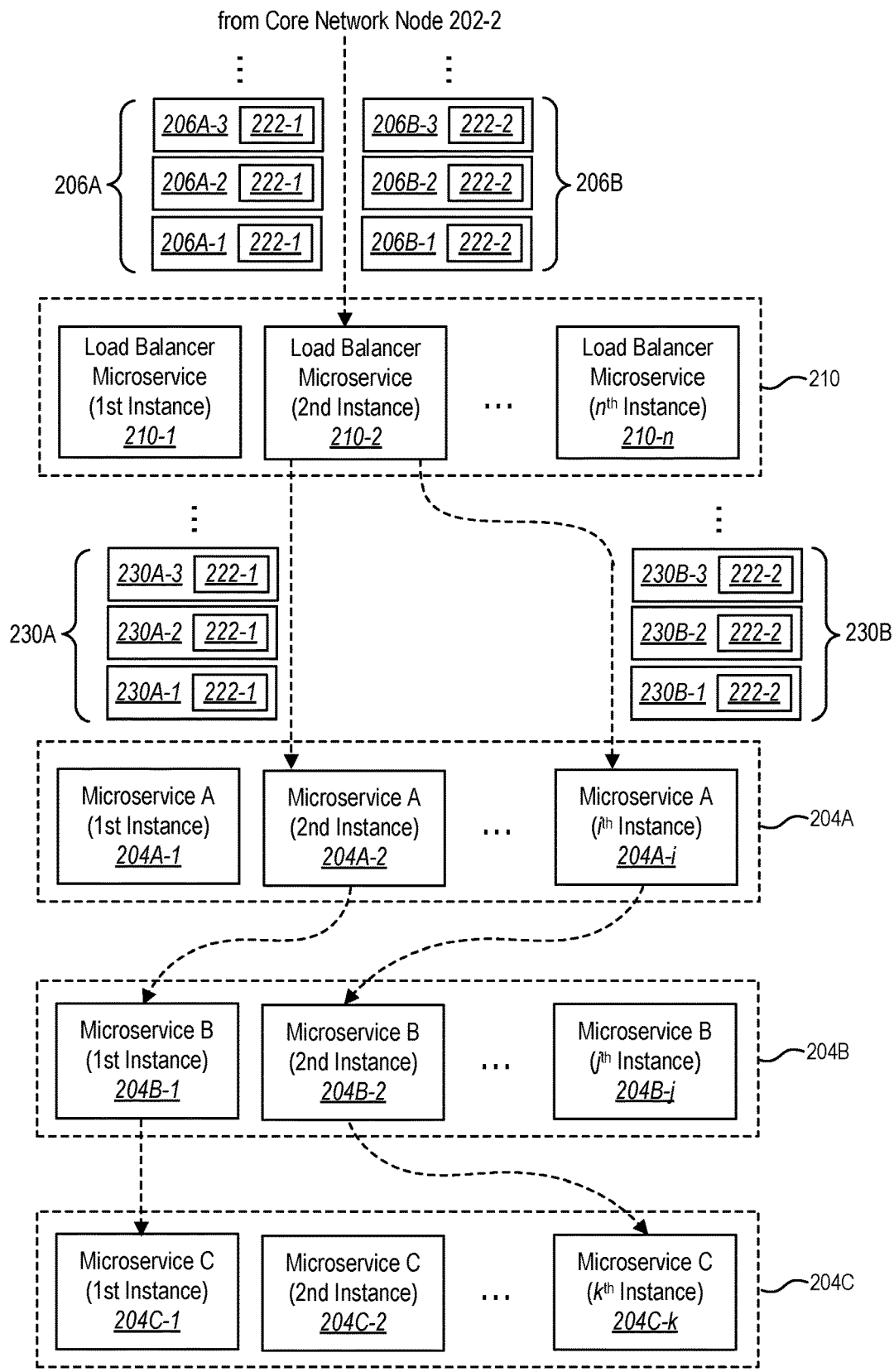
FIG. 2E shows how UDP packets corresponding to different sessions can be processed by the core network node.

FIG. 2E shows how UDP packets 206 corresponding to different sessions can be processed by the core network node 202-1. More specifically, FIG. 2E shows how UDP packets 206 corresponding to the same session can be processed by the same microservice instances in the core network node 202-1. FIG. 2E also shows how, for the sake of load balancing, UDP packets 206 corresponding to different sessions can be processed by different microservice instances in the core network node 202-1.

FIG. 2E shows a plurality of UDP packets 206A, 206B corresponding to different sessions. More specifically, FIG. 2E shows a first plurality of UDP packets 206A corresponding to session A and a second plurality of UDP packets 206B corresponding to session B. The first plurality of UDP packets 206A includes UDP packet 206A-1, UDP packet 206A-2, UDP packet 206A-3, and so forth. The second plurality of UDP packets 206B includes UDP packet 206B-1, UDP packet 206B-2, UDP packet 206B-3, and so forth.

Each of the UDP packets 206A, 206B can include the information that is included in the UDP packet 206 shown in FIG. 2B. For the sake of simplicity, not all of this information is shown in FIG. 2E. However, FIG. 2E shows the first plurality of UDP packets 206A with session information 222-1 identifying session A. Similarly, FIG. 2E shows the second plurality of UDP packets 206B with session information 222-2 identifying session B. The session information 222-1, 222-2 in a particular UDP packet 206A, 206B can be included in a higher layer packet 220.

All of the UDP packets 206A, 206B from a particular core network node are delivered to the same instance of the load balancer microservice 210. In the depicted example, it will be assumed that all of the UDP packets 206A, 206B from the core network node 202-2 are delivered to the second instance of the load balancer microservice 210-2. The second instance of the load balancer microservice 210-2 creates HTTP packets 230A, 230B based on the UDP packets 206A, 206B, in the manner described above. FIG. 2E shows a first plurality of HTTP packets 230A that are created based on the UDP packets 206A corresponding to session A and a second plurality of HTTP packets 230B that are created based on the UDP packets 206B corresponding to session B. The first plurality of HTTP packets 230A includes HTTP packet 230A-1, HTTP packet 230A-2, HTTP packet 230A-3, and so forth. The second plurality of HTTP packets 230B includes HTTP packet 230B-1, HTTP packet 230B-2, HTTP packet 230B-3, and so forth.

Each of the HTTP packets 230A, 230B can include the information that is included in the HTTP packet 230 shown in FIG. 2B. For the sake of simplicity, not all of this information is shown in FIG. 2E. However, FIG. 2E shows the first plurality of HTTP packets 230A with session information 222-1 identifying session A. Similarly, FIG. 2E shows the second plurality of HTTP packets 230B with session information 222-2 identifying session B. The session information 222-1, 222-2 in a particular HTTP packet 230A, 230B can be included in a cookie 236 within an HTTP header 232, as shown in FIG. 2B.

Based on the session information 222-1 as well as the records 244-1, 244-2, 244-3 contained in the data structure 242, all HTTP packets 230A that are created based on the UDP packets 206A corresponding to session A are routed to the second instance of microservice A 204A-2, the first instance of microservice B 204B-1, and the first instance of microservice C 204C-1. On the other hand, based on the session information 222-2 and the records 244-4, 244-5, 244-6 contained in the data structure 242, all HTTP packets 230B that are created based on the UDP packets 206B corresponding to session B are routed to the $i^{th}$ instance of microservice A 204A-i, the second instance of microservice B 204B-2, and the $k^{th}$ instance of microservice C 204C-k.

Under some circumstances, the load balancer microservice 210 can receive a UDP packet corresponding to a new session, i.e., a session for which the load balancer microservice 210 has not previously processed any UDP packets. When this occurs, the cookie lookup components 240 will not be able to find any indication that the session has previously been associated with any microservice instances. In this case, the networking components 208 make a decision about which microservice instances should handle packets corresponding to the new session. This decision can be based at least in part on the load being experienced by the various microservice instances. Information about which microservice instances are associated with the new session can be recorded (e.g., in the data structure 242) and used for routing future packets corresponding to the new session.

For example, suppose that the load balancer microservice 210 receives a UDP packet corresponding to a new session, which will be referred to as session C. No information about session C is recorded in the data structure 242. Therefore, when information about session C is extracted from an HTTP packet that is created based on the UDP packet, the cookie lookup components 240 will not be able to find any information about microservice instances associated with session C. In this case, the networking components 208 make a decision about which microservice instances should receive the HTTP packet. For example, the networking components 208 could decide that the first instance of microservice A 204A-1, the $j^{th}$ instance of microservice B 204B-j, and the second instance of microservice C 204C-2 should receive the HTTP packet. Additional record(s) can be created in the data structure 242 to record the association between session C and these selected microservice instances 204A-1, 204B-j, 204C-2 for use in routing future packets corresponding to session C.

The core network nodes 202-1, 202-2 can be any components, devices, terminals, or the like that function within a core network of a cellular network. In some embodiments, the core network node 202-1 could be a serving gateway (SGW), and the core network node 202-2 could be a mobility management entity (MME). In some embodiments, the core network node 202-1 could be a packet gateway (PGW), and the core network node 202-2 could be a serving gateway SGW.

Figure 3:
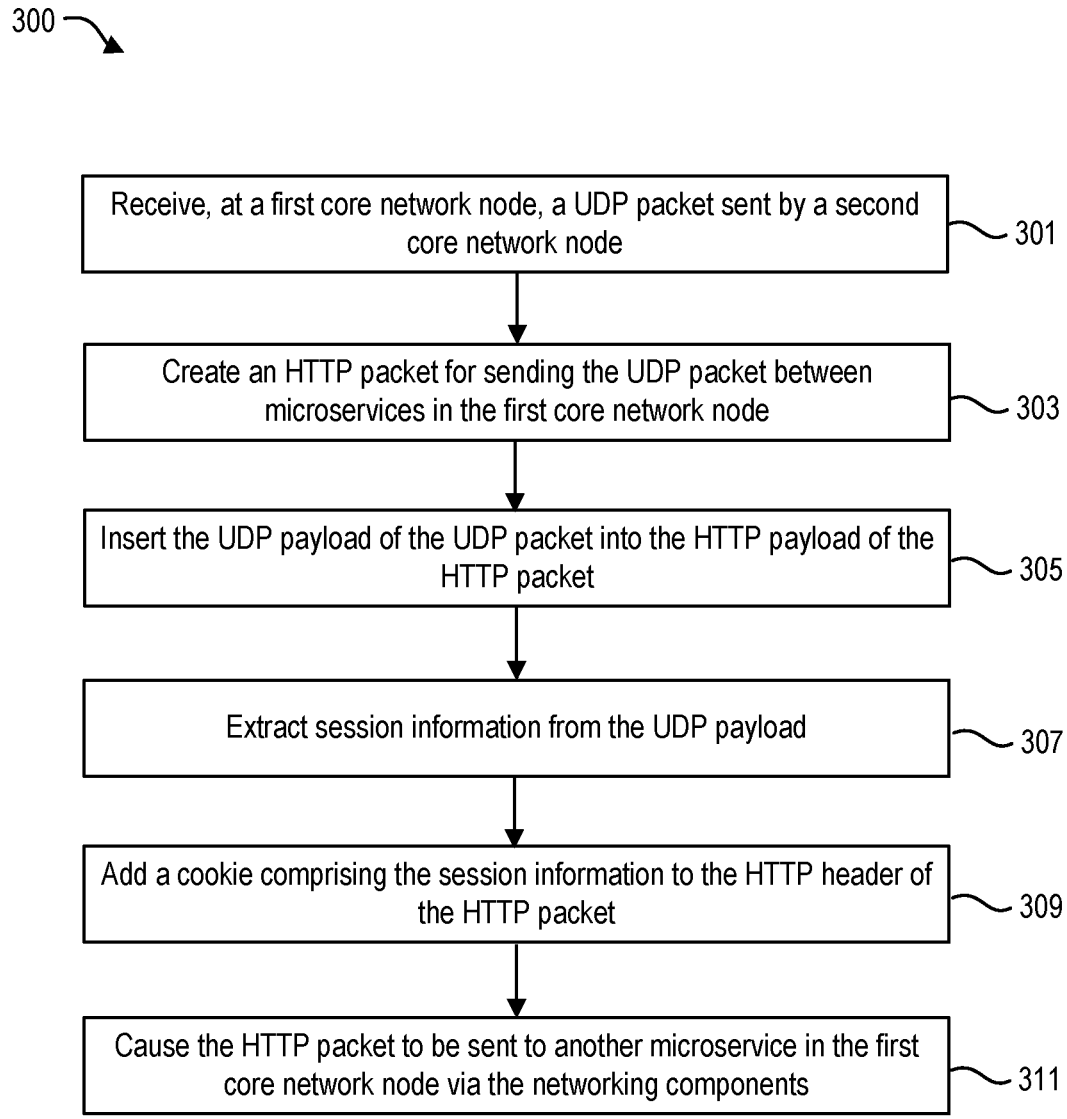
FIG. 3 illustrates an example of a method that can be implemented by a load balancer microservice in accordance with an embodiment of the present disclosure.

FIG. 3 illustrates an example of a method 300 for intelligent load balancing in a microservice environment in accordance with an embodiment of the present disclosure. The method 300 will be described in relation to the example that was described above in connection with FIGS. 2A-E. The method 300 can be implemented by a load balancer microservice 210 in a first core network node 202-1 that comprises a plurality of microservices 204, 210.

The method 300 includes receiving 301, at a first core network node 202-1, a UDP packet 206 from a second core network node 202-2. The UDP packet 206 comprises a UDP payload 218, and the UDP payload 218 comprises a higher layer packet 220 that includes session information 222 identifying a session corresponding to the higher layer packet 220.

The method 300 also includes creating 303 an HTTP packet 230 for sending the UDP packet 206 between the plurality of microservices 204 in the first core network node 202-1.

The method 300 also includes inserting 305 the UDP payload 218 of the UDP packet 206 into the HTTP payload 234 of the HTTP packet 230.

The method 300 also includes extracting 307 session information 222 from the UDP payload 218.

The method 300 also includes adding 309 a cookie 236 comprising the session information 222 to the HTTP header 232 of the HTTP packet 230.

The method 300 also includes causing 311 the HTTP packet 230 to be sent to another microservice 204 in the first core network node 202-1 via the networking components 208. For example, the HTTP packet 230 could be sent to microservice A 204A. Microservice A 204A comprises a plurality of microservice instances 204A-1, 204A-2, 204A-i that could potentially receive the HTTP packet 230. The session information 222 in the cookie 236 causes the networking components 208 to route the HTTP packet 230 to a microservice instance (e.g., the second instance of microservice A 204A-2) that is associated with the session corresponding to the higher layer packet 220 in the UDP packet 206.

Figure 4:
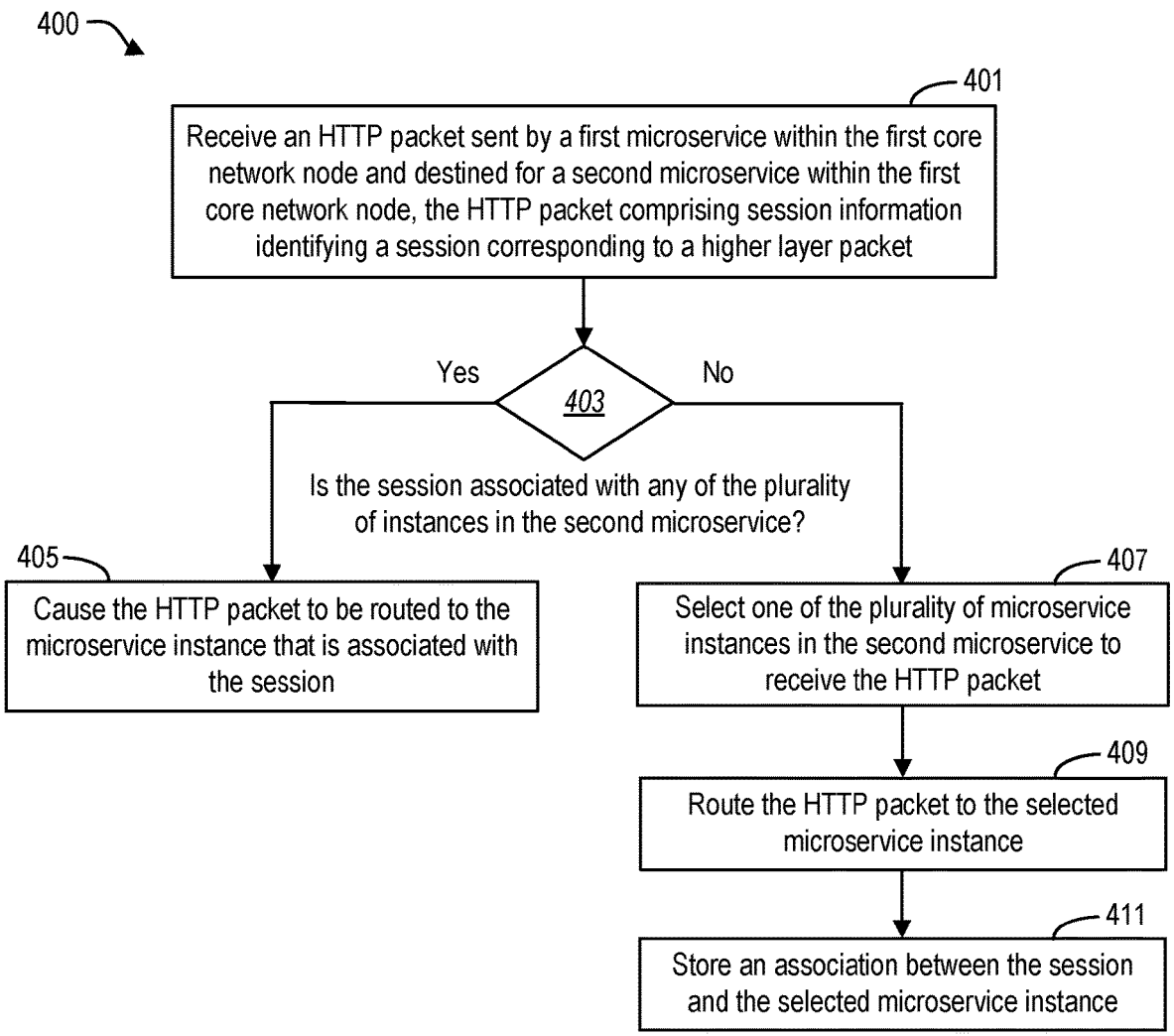
FIG. 4 illustrates an example of a method that can be implemented by networking components in accordance with an embodiment of the present disclosure.

FIG. 4 illustrates another example of a method 400 for intelligent load balancing in a microservice environment in accordance with an embodiment of the present disclosure. The method 400 will be described in relation to the example that was described above in connection with FIGS. 2A-E. The method 400 can be implemented by networking components 208 in a cellular network that includes a first core network node 202-1 comprising a plurality of microservices 204, 210.

The method 400 includes receiving 401 an HTTP packet 230 sent by a first microservice within the first core network node 202-1 and destined for a second microservice within the first core network node 202-1. The second microservice can include a plurality of microservice instances. For example, the HTTP packet 230 can be sent by the load balancer microservice 210 and destined for microservice A 204A, which includes a plurality of microservice instances 204A-1, 204A-2, 204A-i. The HTTP packet 230 comprises an HTTP header 232 and an HTTP payload 234. The HTTP payload 234 comprises a UDP payload 218 from a UDP packet 206. The HTTP header 232 comprises a cookie 236 that includes session information 222 identifying a session corresponding to a higher layer packet 220 in the UDP payload 218.

The method 400 also includes determining 403, based at least in part on the session information 222, whether the session is associated with any of the plurality of microservice instances in the second microservice (e.g., whether the session is associated with any of the microservice instances 204A-1, 204A-2, 204A-i in microservice A 204). This can involve searching one or more data structures (e.g., the data structure 242) that store associations between particular sessions and particular microservice instances.

When it is determined that the session is associated with a microservice instance in the second microservice, then the method 400 includes causing 405 the HTTP packet 230 to be routed to the microservice instance that is associated with the session. For example, as discussed above, when it is determined that the HTTP packet 230 corresponds to session A and it is also determined that session A is associated with the second instance of microservice A 204A-2 (e.g., via the record 244-1 in the data structure 242), then the HTTP packet 230 can be routed to the second instance of microservice A 204A-2.

When it is determined that the session is not associated with any of the plurality of microservice instances in the second microservice, then the method 400 includes selecting 407 one of the plurality of microservice instances in the second microservice to receive the HTTP packet 230. For example, if it is determined that the HTTP packet 230 corresponds to a new session and the new session is not associated with any of the instances 204A-1, 204A-2, 204A-i of microservice A 204A, then the networking components 208 can select one of the instances 204A-1, 204A-2, 204A-i of microservice A 204A to receive the HTTP packet 230. In some embodiments, the selection of one of the instances 204A-1, 204A-2, 204A-i of microservice A 204A can be based at least in part on a degree of loading currently experienced by the instances 204A-1, 204A-2, 204A-i of microservice A 204A. For example, if the first instance of microservice A 204A-1 is only lightly loaded but the other instances of microservice A 204A-2, 204A-i are heavily loaded, then the first instance of microservice A 204A-1 can be selected to receive the HTTP packet 230.

The method 400 also includes routing 409 the HTTP packet 230 to the selected microservice instance. For example, if the first instance of microservice A 204A-1 is selected to receive the HTTP packet 230, then the networking components 208 can cause the HTTP packet 230 to be routed to the first instance of microservice A 204A-1.

The method 400 also includes storing 411 an association between the session and the selected microservice instance. This can involve creating a new record in a data structure (e.g., the data structure 242).

Figure 5:
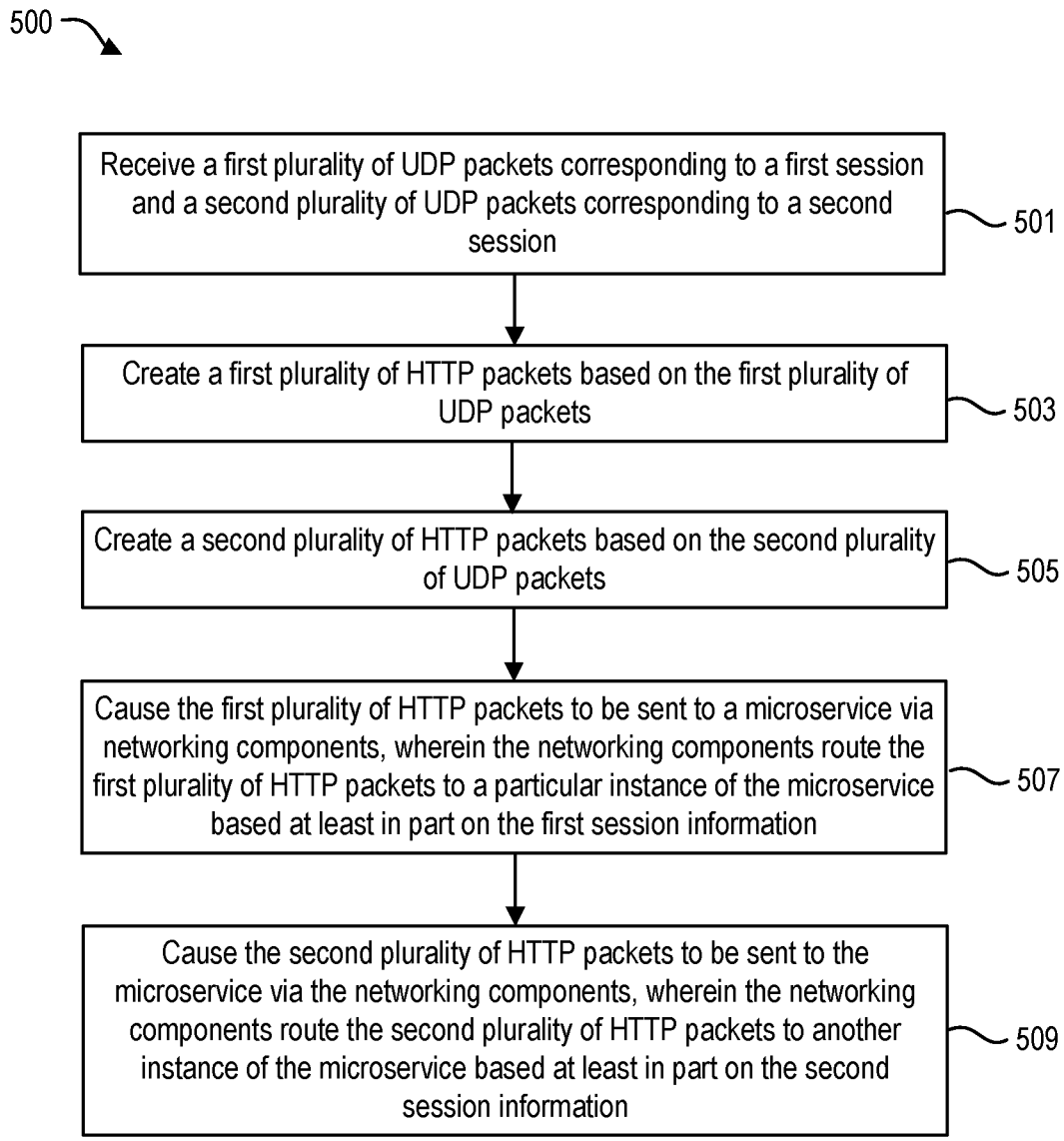
FIG. 5 illustrates another example of a method that can be implemented by a load balancer microservice in accordance with an embodiment of the present disclosure.

FIG. 5 illustrates another example of a method 500 for intelligent load balancing in a microservice environment in accordance with an embodiment of the present disclosure. The method 500 will be described in relation to the example that was described above in connection with FIGS. 2A-E. The method 500 can be implemented by a load balancer microservice 210 in a first core network node 202-1 that comprises a plurality of microservices 204, 210.

The method 500 includes receiving 501 a first plurality of UDP packets 206A corresponding to a first session and a second plurality of UDP packets 206B corresponding to a second session.

The method 500 also includes creating 503 a first plurality of HTTP packets 230A based on the first plurality of UDP packets 206A. The first plurality of HTTP packets 230A each comprise first session information 222-1 identifying the first session.

The method 500 also includes creating 505 a second plurality of HTTP packets 230B based on the second plurality of UDP packets 206B. The second plurality of HTTP packets 230B each comprise second session information 222-2 identifying the second session.

The method 500 also includes causing the first plurality of HTTP packets 230A to be sent to a microservice 204A via networking components 208. The networking components 208 route the first plurality of HTTP packets 230A to a particular instance of the microservice 204A-2 based at least in part on the first session information 222-1 in the first plurality of HTTP packets 230A.

The method 500 also includes causing the second plurality of HTTP packets 230B to be sent to the microservice 204A via the networking components 208. The networking components 208 route the second plurality of HTTP packets 230B to another instance of the microservice 204A-i based at least in part on the second session information 222-2 in the second plurality of HTTP packets 230B.

Figure 6:
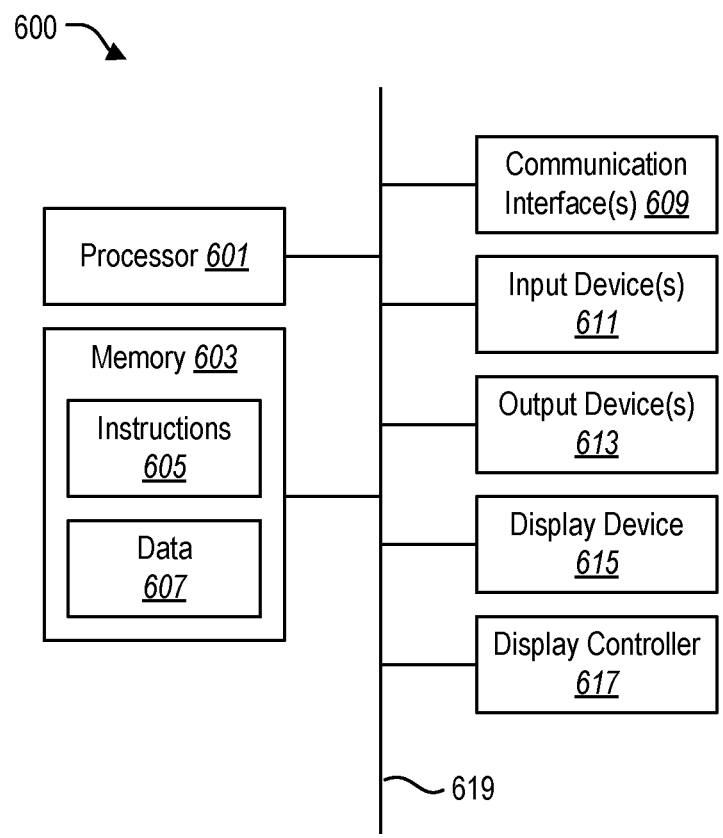
FIG. 6 illustrates certain components that can be included within a computing system that can be used to implement the actions and operations described herein.

FIG. 6 illustrates certain components that can be included within a computing system 600 that can be used to implement the actions and operations described herein. In some embodiments, a plurality of computing systems 600 can collectively implement the actions and operations described herein.

The computing system 600 includes a processor 601 and memory 603 in electronic communication with the processor

601. Instructions 605*a* and data 607*a* can be stored in the memory 603. The instructions 605*a* can be executable by the processor 601 to implement some or all of the methods, steps, operations, actions, or other functionality disclosed herein. Executing the instructions 605*a* can involve the use of the data 607*a* that is stored in the memory 603. When the processor 601 executes the instructions 605*a*, various instructions 605*b* can be loaded onto the processor 601, and various pieces of data 607*b* can be loaded onto the processor 601.

Unless otherwise specified, any of the various examples of modules and components described herein can be implemented, partially or wholly, as instructions 605*a* stored in memory 603 and executed by the processor 601. Any of the various examples of data described herein can be among the data 607*a* that is stored in memory 603 and used during execution of the instructions 605*a* by the processor 601.

Although just a single processor 601 and a single memory 603 are shown in the computing system 600 of FIG. 6, in an alternative configuration, a combination of processors and/or a combination of memory devices could be used.

The instructions 605*a* in the memory 603 can be executable by the processor 601 to perform some or all aspects of the methods that have been described herein. The data 607*a* stored in the memory 603 can include any of the various examples of data described herein, including any data that is stored, accessed, or otherwise used in connection with the methods that have been described herein.

The computing system 600 can also include various other components, including one or more communication interfaces 609, one or more input devices 611, and one or more output devices 613.

The communication interface(s) 609 can be configured to communicate with other computing systems and/or networking devices. This includes receiving data transmissions from other computing systems and/or networking devices, and also sending data transmissions to other computing systems and/or networking devices. The communication interface(s) 609 can be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The various components of the computing system 600 can be coupled together by one or more buses, which can include a power bus, a control signal bus, a status signal bus, a data bus, etc. For simplicity, the various buses are illustrated in FIG. 6 as a bus system 619.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment"

or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for intelligent load balancing in a microservice environment, the method being implemented by a load balancer microservice in a first core network node that comprises a plurality of microservices, the method comprising:
   receiving a User Datagram Protocol (UDP) packet from a second core network node, wherein the UDP packet comprises a UDP payload, and wherein the UDP payload comprises a higher layer packet that includes session information identifying a session corresponding to the higher layer packet;
   creating a Hypertext Transfer Protocol (HTTP) packet for sending the UDP packet between the plurality of microservices in the first core network node;
   inserting the UDP payload of the UDP packet into the HTTP payload of the HTTP packet;
   adding a cookie comprising the session information to an HTTP header of the HTTP packet; and
   causing the HTTP packet to be sent to another microservice in the first core network node via networking components, wherein the microservice comprises a plurality of microservice instances that could receive the HTTP packet, and wherein the session information in the cookie causes the networking components to route the HTTP packet to a microservice instance that is associated with the session corresponding to the higher layer packet in the UDP packet.

2. The method of claim 1, further comprising extracting the session information from the UDP payload of the UDP packet based at least in part on a known offset from a beginning of the UDP payload.

3. The method of claim 1, further comprising creating a custom header in the HTTP payload of the HTTP packet, wherein the custom header comprises a source address and a source port corresponding to the second core network node.

4. The method of claim 1, wherein:
   the first core network node comprises a serving gateway (SGW); and
   the second core network node comprises a mobility management entity.

5. The method of claim 1, wherein:
   the first core network node comprises a packet gateway (PGW); and
   the second core network node comprises a serving gateway (SGW).

6. The method of claim 1, wherein the higher layer packet comprises a packet that is sent based on the General Packet Radio Service (GPRS) Tunneling Protocol (GTP).

7. A method for intelligent load balancing in a microservice environment, the method being implemented by networking components in a telecommunications network, the telecommunications network including a first core network node comprising a plurality of microservices, the method comprising:
   receiving an Hypertext Transfer Protocol (HTTP) packet sent by a first microservice within the first core network node and destined for a second microservice within the first core network node, wherein the second microservice comprises a plurality of microservice instances, wherein the HTTP packet comprises an HTTP header and an HTTP payload, wherein the HTTP payload comprises a User Datagram Protocol (UDP) payload from a UDP packet, and wherein the HTTP header comprises a cookie that includes session information identifying a session corresponding to a higher layer packet in the UDP payload;
   determining, based at least in part on the session information, whether the session is associated with any of the plurality of microservice instances in the second microservice;
   when the session is associated with a microservice instance in the second microservice, causing the HTTP packet to be routed to the microservice instance; and
   when the session is not associated with any of the plurality of microservice instances in the second microservice:
      selecting one of the plurality of microservice instances in the second microservice to receive the HTTP packet; and
      routing the HTTP packet to the selected microservice instance.

8. The method of claim 7, further comprising, when the session is not associated with any of the plurality of microservice instances in the second microservice, storing an association between the session and the selected microservice instance.

9. The method of claim 7, wherein determining whether the session is associated with any of the plurality of microservice instances in the second microservice comprises searching one or more data structures that store associations between particular sessions and particular microservice instances.

10. The method of claim 7, wherein selecting one of the plurality of microservice instances in the second microservice to receive the HTTP packet is based at least in part on a degree of loading currently experienced by the plurality of microservice instances in the second microservice.

11. The method of claim 7, wherein:
the HTTP payload of the HTTP packet further comprises a custom header;
the custom header comprises a source address and a source port corresponding to a second core network node; and
the second core network node sends the UDP packet.

12. The method of claim 7, wherein:
the UDP payload comprises the higher layer packet; and
the higher layer packet comprises the session information that is provided in the cookie.

13. A system for intelligent load balancing in a microservice environment, the system comprising:
at least one processor; and
at least one memory storing computer-executable instructions that, when executed by the at least one processor, cause the at least one processor to:
receive, at a first core network node, a first plurality of User Datagram Protocol (UDP) packets corresponding to a first session and a second plurality of UDP packets corresponding to a second session, wherein the first plurality of UDP packets and the second plurality of UDP packets are sent by a second core network node;
create a first plurality of Hypertext Transfer Protocol (HTTP) packets based on the first plurality of UDP packets, wherein the first plurality of HTTP packets each comprise first session information identifying the first session;
create a second plurality of HTTP packets based on the second plurality of UDP packets, wherein the second plurality of HTTP packets each comprise second session information identifying the second session; and
cause the first plurality of HTTP packets and the second plurality of HTTP packets to be sent to a microservice via networking components, wherein the networking components route the first plurality of HTTP packets to a first instance of the microservice based at least in part on the first session information in the first plurality of HTTP packets, and wherein the networking components route the second plurality of HTTP packets to a second instance of the microservice based at least in part on the second session information in the second plurality of HTTP packets.

14. The system of claim 13, wherein:
each UDP packet among the first plurality of UDP packets and the second plurality of UDP packets comprises a higher layer packet;
the higher layer packet in each of the first plurality of UDP packets comprises the first session information; and
the higher layer packet in each of the second plurality of UDP packets comprises the second session information.

15. The system of claim 14, wherein the higher layer packet comprises a packet that is sent based on the General Packet Radio Service (GPRS) Tunneling Protocol (GTP).

16. The system of claim 13, wherein:
each HTTP packet among the first plurality of HTTP packets and the second plurality of HTTP packets comprises a cookie in an HTTP header;
the cookie in each of the first plurality of HTTP packets comprises the first session information; and
the cookie in each of the second plurality of HTTP packets comprises the second session information.

17. The system of claim 13, further comprising additional computer-executable instructions that, when executed by the at least one processor, cause the at least one processor to create a custom header in each of the first plurality of HTTP packets and the second plurality of HTTP packets, wherein the custom header comprises a source address and a source port corresponding to the second core network node.

18. The system of claim 13, wherein:
the networking components route the first plurality of HTTP packets to the first instance of the microservice based on the first session information and a first record in a data structure associating the first session with the first instance of the microservice; and
the networking components route the second plurality of HTTP packets to the second instance of the microservice based on the second session information and a second record in the data structure associating the second session with the second instance of the microservice.

19. The system of claim 13, wherein:
the first core network node comprises a serving gateway (SGW); and
the second core network node comprises a mobility management entity.

20. The system of claim 13, wherein:
the first core network node comprises a packet gateway (PGW); and
the second core network node comprises a serving gateway (SGW).

* * * * *